Oct. 21, 1924.  
F. LJUNGSTRÖM  
1,512,852  
TURBINE DRIVEN LOCOMOTIVE  
Filed April 13, 1922
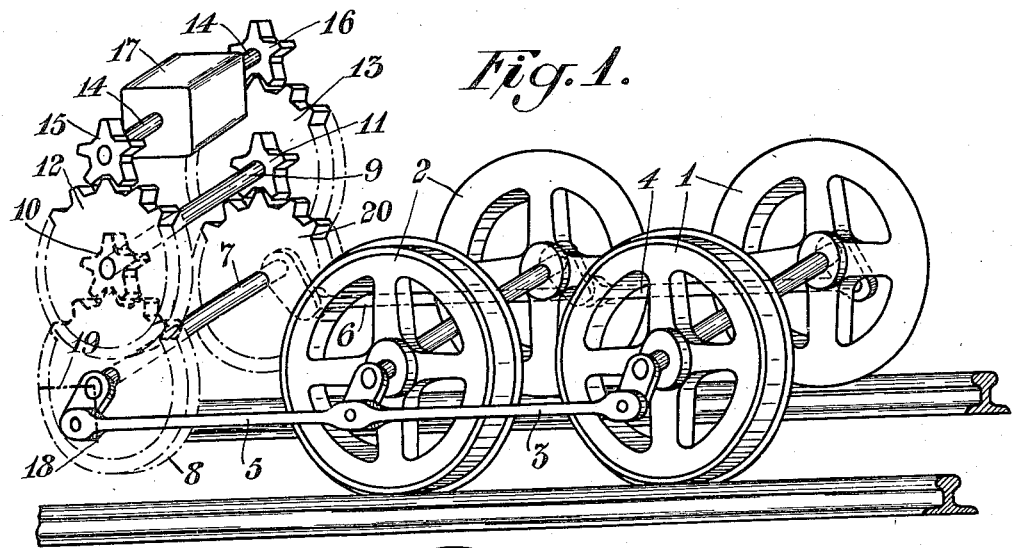
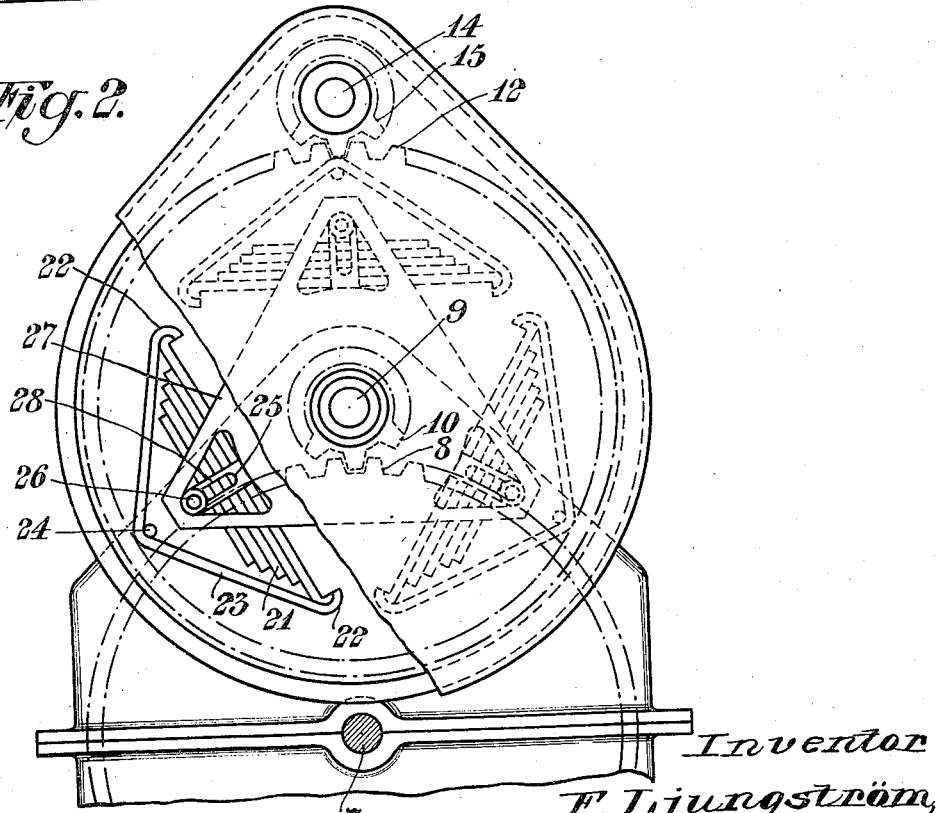
Inventor  
F. Ljungström,  
By Marks & Clerk  
Attys Patented Oct. 21, 1924.

1,512,852

UNITED STATES PATENT OFFICE.

FREDRIK LJUNGSTRÖM, OF LIDINGO-BREVIK, SWEDEN, ASSIGNOR TO AKTIEBOLAGET LJUNGSTRÖMS ÅNGTURBIN, OF STOCKHOLM, SWEDEN, A CORPORATION.

TURBINE-DRIVEN LOCOMOTIVE.

Application filed April 13, 1922. Serial No. 552,422.

*To all whom it may concern:*

Be it known that I, FREDRIK LJUNGSTRÖM, chief engineer, subject of the King of Sweden, residing at Lidingo-Brevik, Sweden, have invented certain new and useful Improvements in Turbine-Driven Locomotives, of which the following is a specification.

In turbine-driven locomotives provided with toothed gearings to reduce the number of revolutions of the driving machinery, certain difficulties have always been met with in eliminating such additional forces that are produced by reason of the crank movement transmitting power to the driving wheels of the locomotive. Particularly, in the case of locomotives provided with a turbine machinery having a very high number of revolutions and a double speed reducing gearing, such additional forces have exerted very severe strains on the teeth and turbine parts, in that the toothed wheels intended for great amounts of power become relatively heavy and attain a high energy of gyration at the speeds prevailing.

In order to avoid the said drawbacks, arrangements with double bearings and a pendulum suspension of certain shafts in the toothed gearing have been proposed heretofore, but these arrangements alone have proved not to be sufficiently effective.

The present invention relates to an arrangement in turbine-driven locomotives provided with toothed gearings to reduce the number of revolutions of the driving engine, and the object of the invention is to eliminate the above-mentioned additional forces. To produce this result, a means previously used for similar purposes is employed in this case too, such means consisting in a resilient connection between a gear wheel and the shaft thereof, which connection is adapted in a novel way, however, according to the invention.

Heretofore, in order to produce a soft engagement in toothed gearings and to eliminate injurious strains, toothed rims have been used which are resilient with respect to the corresponding axle. However, such gear wheels with a resilient rim heretofore have always been arranged either at the first or at the last wheel of the gearing. Such an arrangement, however, would cause very considerable inconveniences in the present case. If, namely, a resilient toothed rim be arranged at the first wheel of the gearing attached to the turbine shaft, the large masses of the gearing following after the said wheel would be without resiliency, and, on the other hand, a spring device arranged at the said wheel would become larger than the relatively small wheel proper, and, consequently, it would perhaps require to be provided with a damping means also. Moreover, the strains in the teeth of a wheel mounted on the crank axle and of an intermediate pinion driving said wheel would become too great, in that the said crank-axle-wheel has a comparatively heavy toothed rim at a great radius and consequently a great energy of gyration. If, on the other hand, the spring device were disposed at the last wheel of the gearing, that is to say at the said crank-axle-wheel, the forces to be damped would be enormously great, whereas the movements due to resiliency or the variations in the angular velocity would be very small, which would only cause "chewing" in the spring action and exhaustion and wear of the material. Moreover, the means for suspending the springs would then become relatively bulky, while with smaller frictional paths a greater pressure on the wearing surfaces of the spring device would be the result.

For all the above-mentioned reasons, the toothed rim of one or more intermediate wheels of the toothed gearing is, according to the present invention, resiliently connected with the shaft carrying the wheel. By such an arrangement the above-mentioned drawbacks are avoided, while the object in view, the elimination of the said additional forces, is attained. By providing the resiliency at one or more of the intermediate wheels of the gearing, the advantage is attained that the resiliency gear wheel will be located near the crank movement so that as great parts as possible of the gearing will be situated on the resilient side, whereas, on the other hand, the spring device will be arranged on wheels running at a somewhat greater rate of speed and, preferably, on the wheel having the greatest energy of gyration. It is also of advantage that the means for suspending the resilient toothed rim will be as small as possible, while simultaneously the pressure on the wearing surfaces within the spring arrangement will be comparatively small, whereas the frictional paths are great. These advantages are also attained by the present invention.

The invention is illustrated in the accompanying drawing wherein, Fig. 1 shows diagrammatically and in perspective, a toothed gearing arranged in a turbine-driven locomotive, between the turbine and the driving wheels, whereas Fig. 2 shows an embodiment of the spring device proper, viewed from the side, and with part of the outer casing broken away.

1 and 2 denote the driving wheels which are interconnected by means of coupling rods 3 and 4, and connected through connecting rods 5 and 6 with the lay shaft 7 rotating slowly in the toothed gearing. This shaft has the same number of revolutions as the axles on which the driving wheels 1 and 2 are mounted. Attached to the shaft 7 are two large gear wheels 8 and 20 meshing each with a pinion 10 and 11 respectively arranged on the shaft 9. Attached to the same shaft 9 are also large gear wheels 12 and 13 meshing each with the pinions 15 and 16 respectively mounted on the turbine shaft 14. Thus, the power and the motion is transmitted from the turbine 17, partly through a gearing reducing the movement and partly through connecting rods and coupling rods to the driving wheels.

By reason of the uneven moments exerted on the shaft 7 by the movements of the connecting rods, and on account of the oscillating movement, and, perhaps, by a play occurring in the bearings, varying forces are produced in the gearing. These forces are greatest when one of the cranks attached to the shaft 7 is in the position 18, and smallest when the cranks assume the position 19, while at the same time opposed forces are produced at the other crank, small varying forces also occurring in these changes of the moment. All this causes uneven strains in the teeth, and in a gearing wherein large amounts of power are transmitted, the said strains may amount to values that are injurious to the gearing.

According to the invention, these additional forces are eliminated by the toothed rim of an intermediate wheel, for example of the gear 12, being arranged so as to be resilient with respect to the shaft carrying the wheel. The said forces are then equalized, partly through the resiliency and partly by the friction in the spring arrangement proper.

In the embodiment shown in Fig. 2, wherein the same characters are used for corresponding parts in Fig. 1, the spring arrangement is devised in the following manner. The gear wheel 12 arranged on the counter-shaft 9 is provided with a resilient toothed rim, the resiliency being attained by means of spring blades 21 so arranged that their outer ends 22 are connected by means of a bracket 23 with a bolt 24 attached to the toothed rim, while the middle portion 25 of the springs is connected by means of another bracket 28 with a bolt 26 attached to a frame 27 which is rigidly connected with the nave of the wheel. On account of this arrangement, the toothed rim of the gear wheel 12 will rotate with respect to the nave of the wheel on varying loads occurring in the crank.

It is obvious that spiral springs for instance could also be used, but these would only produce an oscillating motion of the toothed rim relatively to the nave, such oscillation being damped by the employment of the spring blades shown on account of their own inner friction.

Other suspending means for the springs than those above described may be used without departing from the principle of the invention. The employment of still another shaft with gear wheels belonging thereto is conceivable for a further reduction of the number of revolutions. In such a case the spring device must be arranged either in the intermediate wheel having the greatest gyratory energy, or, if required, in a plurality of intermediate wheels.

What I claim as new and desire to secure by Letters Patent of the United States is:—

1. An arrangement in turbine-driven locomotives provided with toothed gearings to reduce the number of revolutions of the driving engine, characterized by the toothed rim of at least one intermediate wheel of the toothed gearing being resiliently connected with the shaft carrying the wheel.

2. An arrangement according to claim 1, wherein the toothed gearing consists of gear wheels running at speeds of three different numbers of revolutions, characterized by the gear wheel running at an intermediate speed having its toothed rim resiliently connected with its shaft.

In testimony whereof I affix my signature in presence of two witnesses.

FREDRIK LJUNGSTRÖM.

Witnesses:
S. SWENSON,
T. W. BURZROPH.